United States Patent
Wang

(10) Patent No.: US 12,411,601 B1
(45) Date of Patent: Sep. 9, 2025

(54) SYSTEMS AND METHODS FOR CONVERSION OF ADMINISTRATIVE SYSTEMS

(71) Applicant: DataInfoCom USA, Inc., Austin, TX (US)

(72) Inventor: Wensu Wang, Katy, TX (US)

(73) Assignee: DataInfoCom USA, Inc., Austin, TX (US)

( * ) Notice: Subject to any disclaimer, the term of this patent is extended or adjusted under 35 U.S.C. 154(b) by 1168 days.

(21) Appl. No.: 17/110,247

(22) Filed: Dec. 2, 2020

Related U.S. Application Data

(60) Provisional application No. 62/976,191, filed on Feb. 13, 2020.

(51) Int. Cl.
| | | |
|---|---|---|
| G06F 17/00 | (2019.01) | |
| G06F 3/06 | (2006.01) | |
| G06F 16/21 | (2019.01) | |
| G06F 18/214 | (2023.01) | |
| G06Q 10/063 | (2023.01) | |
| G06Q 10/0631 | (2023.01) | |
| G06Q 10/0637 | (2023.01) | |

(52) U.S. Cl.
CPC .......... *G06F 3/0607* (2013.01); *G06F 3/0683* (2013.01); *G06F 16/214* (2019.01); *G06F 18/214* (2023.01); *G06Q 10/063* (2013.01); *G06Q 10/06312* (2013.01); *G06Q 10/06375* (2013.01)

(58) Field of Classification Search
CPC .... G06F 3/0607; G06F 3/0683; G06F 16/214; G06F 18/214; G06Q 10/063; G06Q 10/06312; G06Q 10/06375
See application file for complete search history.

(56) References Cited

U.S. PATENT DOCUMENTS

| | | | |
|---|---|---|---|
| 6,151,608 A * | 11/2000 | Abrams | G06F 16/214 |
| | | | 707/999.1 |
| 9,996,799 B2 | 6/2018 | Bostick et al. | |
| 10,346,454 B2 | 7/2019 | Moeller-Bertram et al. | |
| 11,086,549 B2 * | 8/2021 | Ramakrishnan | G06F 3/0647 |
| 11,790,262 B2 | 10/2023 | Ghatage et al. | |
| 2002/0138449 A1 | 9/2002 | Kendall et al. | |
| 2003/0041059 A1 | 2/2003 | Lepien | |
| 2007/0288535 A1 * | 12/2007 | Shitomi | G06F 3/0643 |

(Continued)

OTHER PUBLICATIONS

U.S. Appl. No. 17/107,873, filed Nov. 30, 2020 (Wang).
U.S. Appl. No. 17/687,632, filed Mar. 5, 2022 (Wang).
U.S. Appl. No. 17/715,729, filed Apr. 7, 2022 (Wang).

*Primary Examiner* — Greta L Robinson
(74) *Attorney, Agent, or Firm* — Chad Peterson

(57) ABSTRACT

Methods, systems and apparatuses, including computer programs encoded on computer storage media, are provided for automatically converting a legacy administrative system to a target administrative system. The data sets, product rules, business functions/processes, business rules, and calculation modules of both systems are analyzed by an analysis system to determine elements in common. Elements of the legacy system not present in the target system are generated and the legacy system is then fully migrated to the target system. For data required by the target system not present in the legacy system, data-driven prediction models may be used to predict the required data.

20 Claims, 8 Drawing Sheets

(56) References Cited

U.S. PATENT DOCUMENTS

| | | | |
|---|---|---|---|
| 2009/0119476 A1* | 5/2009 | Jernigan | G06F 16/214 |
| | | | 711/204 |
| 2013/0132285 A1* | 5/2013 | Richards | G06F 16/214 |
| | | | 705/300 |
| 2015/0019476 A1* | 1/2015 | Hiatt | G06F 16/254 |
| | | | 707/602 |
| 2015/0019488 A1* | 1/2015 | Higginson | G06F 16/214 |
| | | | 707/634 |
| 2017/0352041 A1 | 12/2017 | Ramamurthy et al. | |
| 2018/0322396 A1 | 11/2018 | Ahuja-Cogny et al. | |
| 2019/0065523 A1* | 2/2019 | Singh | G06N 5/01 |
| 2019/0197171 A1* | 6/2019 | Tiwari | G06F 3/067 |
| 2020/0012970 A1* | 1/2020 | Srivastava | G06F 16/23 |
| 2020/0257540 A1* | 8/2020 | Moreno | G06F 9/44505 |

* cited by examiner

SYSTEMS AND METHODS FOR CONVERSION OF ADMINISTRATIVE SYSTEMS

CROSS-REFERENCE TO RELATED APPLICATIONS

The present application claims the benefit of U.S. Provisional Patent Application No. 62/976,191, entitled "SYSTEMS AND METHODS FOR AUTOMATING ADMINISTRATIVE SYSTEM PROCESSES," filed Feb. 13, 2020, which is incorporated by reference herein in its entirety.

BACKGROUND

This specification relates generally to Artificial Intelligence (AI) technologies as applied to transforming administrative systems, such as insurance Policy Administration Systems (PAS), using the latest data-driven architectures and technologies. More specifically, this specification relates to automatic processes for conversion of data, processes, and products from a legacy system to a target system.

Currently, many businesses rely on cumbersome legacy administration systems with deprecated technologies, siloed and unscalable data structure, and manually intensive processes that are error-prone and difficult to scale. At times, a business may want to convert existing data sets and/or processes in a legacy administration system to a target administration system which meets business requirements, to improve operation efficiency, result accuracy, and process transparency.

SUMMARY

In accordance with the foregoing objectives and others, exemplary methods and systems are disclosed herein to transform and/or convert existing items, such as products, procedures, business rules, calculation modules, and/or data sets, in a legacy administration system to a specified, target administration system using the latest data-driven architectures and AI-empowered technologies.

One embodiment is directed to a method for converting a legacy administration system to a target administration system, the method comprising: analyzing the legacy system using an analysis system to determine its components, including but not limited to, data sets, product rules, business processes, and calculation modules; analyzing the target system using the analysis system to determine its components, such as data sets, product rules, business processes, and calculation modules; identifying data required by the target system not present in the legacy system; generating a prediction model targeting the required data and trained using historical data in the legacy system; predicting the required data using the prediction model; migrating data from the legacy system to the target system in compliance with the target data structures and data definitions; and storing the predicted data in the target system.

Another embodiment is directed to a system for converting a legacy administration system to a target administration system, the system comprising: an analysis system adapted to analyze an administrative system to determine its components, including but not limited to, data sets, product rules, business processes, and calculation modules; a product conversion system adapted to convert at least one product from a legacy administrative system to a target administrative system; and a migration system adapted to migrate at least one data set in the legacy administrative system to the target administrative system in accordance with the data structures and data definitions of the target system.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
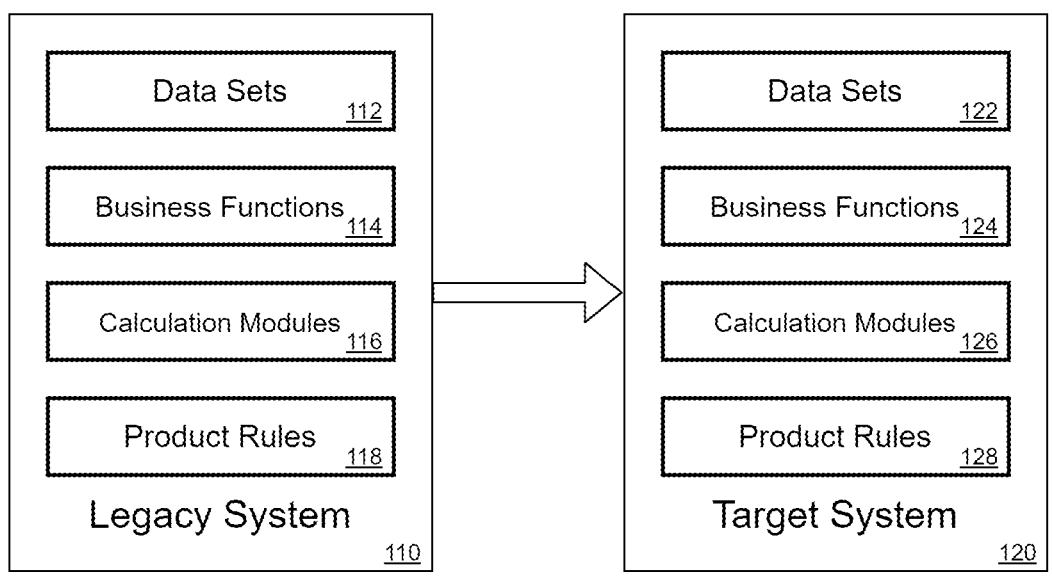
FIG. 1 illustrates the migration of a legacy administration system to a target administration system.

Various legacy administration systems exist, e.g., ALIS, InsPro, DXC Cyberlife, DXC Graphtalk, DXC Ingenium, iWorks, etc., One way to improve business operations is to convert the legacy systems to a target administration system, e.g., Oracle Insurance Policy Administration, using various artificial intelligence (AI) and robotic process automation (RPA) techniques. AI techniques include, but are not limited to, machine learning (ML), deep learning, natural language processing (NLP) (including information extraction (IE)), natural language understanding (NLU), natural language generation (NLG), computer vision, speech recognition, signal processing, etc. Robotic process automation refers to the automation of repetitive tasks, thereby making the process less labor-intensive for humans.

As used herein, "historical data" refers to data sets which are accumulated in the implementation of the administrative systems which can be used to train or otherwise create a data-driven model, and generally includes multiple training instances, each instance may comprise one or more feature inputs with/or without a target output. The target output of a training set may also be referred to herein as a "label." "Current data" or "current input data" refers to data input into the trained model to generate a prediction, forecast, or other output.

AI models include one or more of the following: classification models, regression models, Markov chains, time series models, state space models, Bayesian models, decision trees (including boosted decision trees), neural networks, deep neural networks, convolutional neural networks, recurrent neural networks, long short term memory (LSTM) neural networks, kNN models, Prophet models, support vector machines, or any other appropriate supervised or unsupervised model, or combinations or ensembles (e.g., by bagging, boosting, random forest techniques)

thereof. To train an AI model, the system will generally use a set of historical data, including input variables and a target. Multiple models with different hyperparameters may be created and evaluated to select a preferred model. In one embodiment, a hyperparameter autotuning system may be used to create, test, and select preferred models. Any created models may be periodically retrained using additional historical data and/or an evaluation of the outputs or predictions of the models to be retrained. Additionally, it also includes the latest developed types of the AI technologies, such as transfer learning, semi-supervised, graph neural network, probabilistic machine learning.

Natural language generation (NLG) refers to AI techniques for generating human-readable text from structured data. Such techniques include, but are not limited to, template-based text generation, trained NLG models, etc.

Natural language processing (NLP), natural language understanding (NLU), and natural language information extraction (IE) refer to AI techniques for extracting data from text. These techniques include a set of natural language processing algorithms, including but not limited to, tokenization, word stemming, grammar analysis, bagging of words, term frequency-inverse document frequency (TF-IDF), latent dirichlet allocation (LDA), topic modeling, sentiment analysis, semantic analysis (e.g., doc2vec), keyword identification, bi-directional attention flow (Bi-DAF) networks, etc., to extract information from the text and convert it into a structured format.

The methods and systems described herein provide for the conversion of data from a legacy administration system to a target administration system. As shown in FIG. 1, both the legacy system 110 and target system 120 include data sets (112, 122), business functions, processes, and/or rules (114, 124), calculation modules (116, 126), and/or product rules (118, 128). FIG. 1 illustrates administration systems for insurance providers, but the principles disclosed herein can be used to convert administration systems used in other industries.

The methods and systems are useful for a wide range of insurance and investment products and product administration systems in other industries, including but not limited to, life insurance (term and whole), disability insurance, casualty insurance, income protection insurance, employment insurance, annuities, etc. These insurance/investment products involve similar types of systems related to policy administration. Such systems may include but not limited to, customer data, policy data, and processes such as altering (e.g., increasing or decreasing) insurance coverage, increasing or decreasing contributions (e.g., for an investment product), billing, receiving payments or contributions, making payments (e.g., paying out on a policy retirement date, benefit payments), processing claims, making inflation adjustments to benefits, sending various communications (e.g., annual statements, policy schedules, payment notices, etc.), calculating and paying agent commissions, calculating premiums, etc.

The methods and systems described herein are able to use and synthesize all available data related to the conversion of the system, convert any relevant unstructured data into structured data, identify relevant insurance policy documents and extract relevant information from such documents, create new policies in the target system based on legacy policies, migrate customer data to the target system, predict customer data needed for the target system but unavailable in the legacy system, migrate product rules to the target system, migrate business rules to the target system, migrate calculation modules to the target system, etc.

Figure 2:
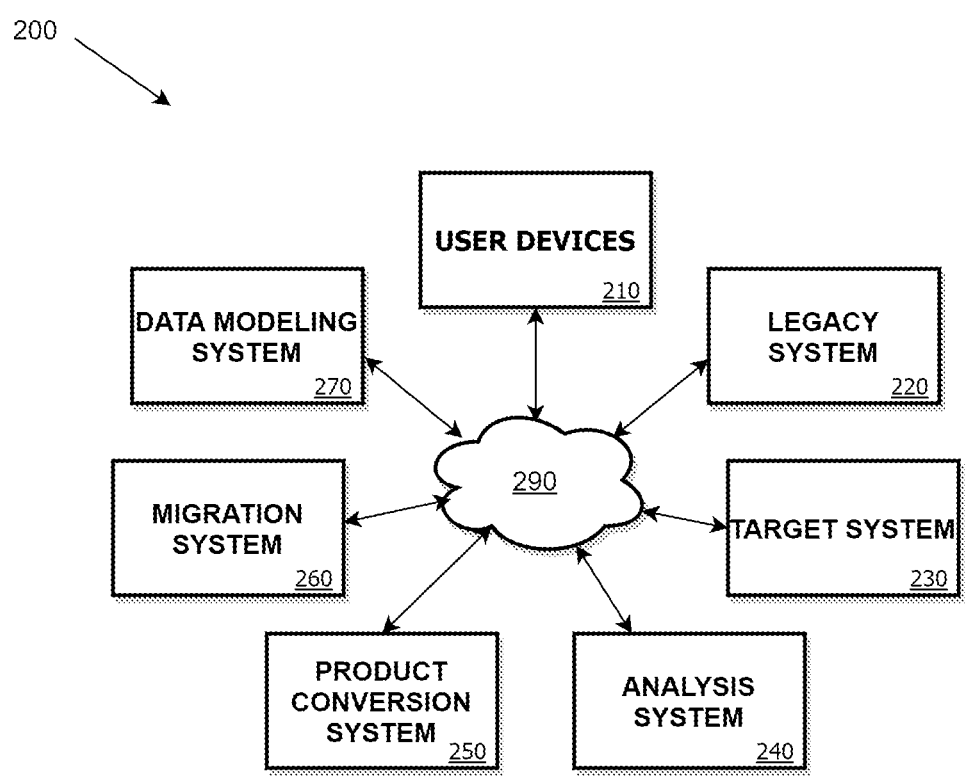
FIG. 2 is a block diagram of a system for migrating a legacy administrative system to a target administrative system.

Referring to FIG. 2, a block diagram of an exemplary system 200 for use in conversion of the legacy administration system is illustrated. The conversion system may include user devices 210, a legacy system 220, a target system 230, an analysis system 240, a product conversion system 250, a migration system 260, and a data modeling system 270. The system components may be remote from each other and interact through a communication network 290. Non-limiting examples of communication networks include local area networks (LANs), wide area networks (WANs) (e.g., the Internet), etc.

In certain embodiments, a user may access any of the other systems via a user device 210 connected to the network 290. A user device 210 may be any computer device capable of accessing any of the other systems, such as by running a client application or other software, like a web browser or web-browser-like application.

The analysis system 240 is adapted to analyze an administrative system (e.g., a PAS) to determine its specifications, including the system configuration, data structures, data definitions, data sets, calculation modules, product rules, business functions or rules, etc. The analysis system may also be adapted to determine types of customer information required by the system.

The product conversion system 250 is adapted to convert the products (e.g., insurance policies) in the legacy system to products in the target system. The product conversion system identifies terms, conditions, and other product rules of the legacy product and identifies corresponding product rules in the target system. The system can create new products in the target administration system based on the product rules of the legacy product.

The migration system 260 is adapted to transfer and/or migrate the data sets (e.g., customer information), business functions, and calculation modules from the legacy system to the target system. Some data, information, functions, rules, etc., may be directly transferrable. Some data required by the target system may not be available in the legacy system. In such cases, the required data may be predicted by a trained model. The model may be trained on historical customer information.

The data modeling system 270 includes one or more systems that work together to train or otherwise create (for types of models that do not require training (e.g., kNN)) prediction models. The data modeling system may be adapted to create any type of model, including but not limited to, classification models, regression models, Markov chains, time series models, state space models, Bayesian models, boosted decision trees, neural networks, convolutional neural networks, recurrent neural networks, LSTM neural networks, or any other appropriate model, or combinations or ensembles thereof. To train a model, the model creation system will generally use a set of historical data, including input variables and a target. Multiple models with different hyperparameters may be created and evaluated to select a preferred model. In one embodiment, a hyperparameter autotuning system may be used to create, test, and select preferred models. The data modeling system may also include systems adapted for cleaning, segmenting, processing, and/or aggregating data for use in training the models; systems adapted to extract features from unstructured data, such as written text, images, video, recorded audio, etc.; systems adapted to update and/or retrain models; and systems adapted to reduce the number of variables in a data set.

Figure 3:
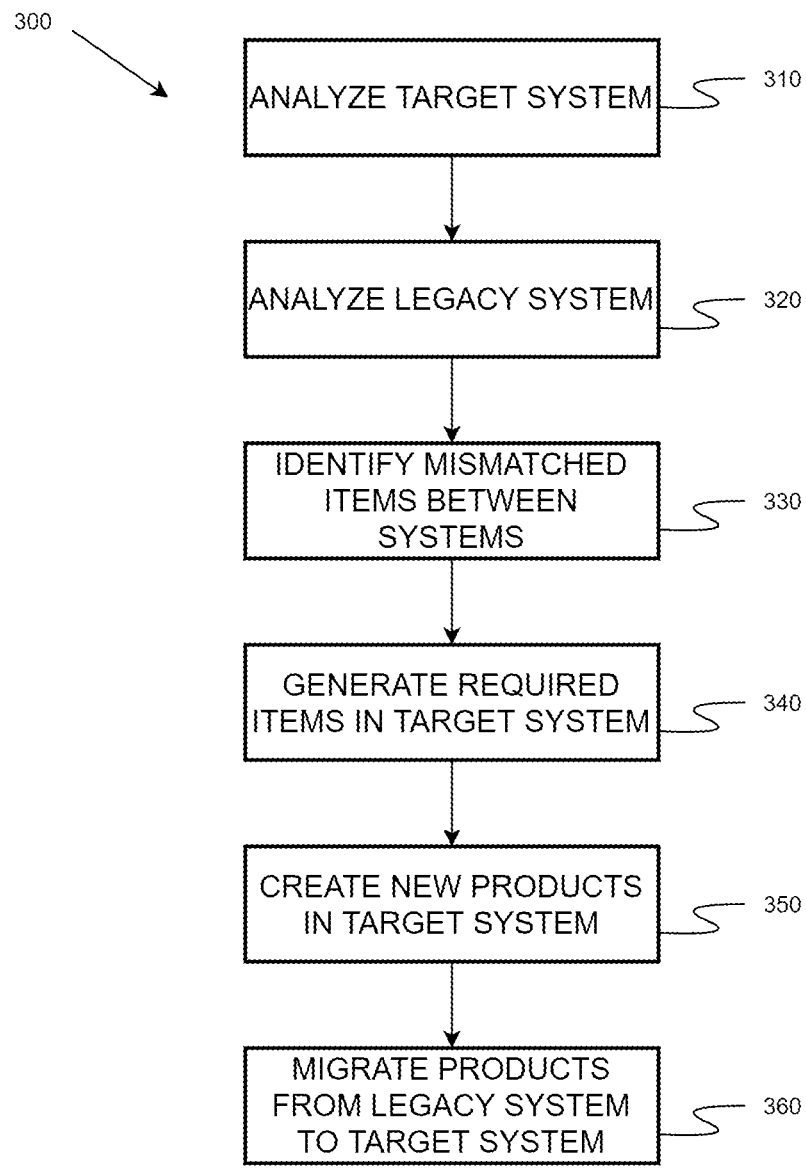
FIG. 3 illustrates an example method for converting a legacy administrative system to a target administrative system.

FIG. 3 illustrates an example method 300 for converting a legacy system to a target system. In step 310, the target system is analyzed, e.g., using analysis system 240, to determine its specifications, including the system configuration, data structures, data definitions, data sets, calculation modules, product rules, business functions, etc.

In step 320, the legacy system is analyzed to determine its specifications, including the system configuration, data structures, data definitions, data sets, calculation modules, product rules, business functions, etc. If the legacy system is a PAS, the plan codes of the legacy system are also analyzed.

In step 330, mismatched items between the legacy system and the target system are identified. For example, data structures, data definitions, data sets, calculation modules, product rules, and business functions that are present in the target system, but not in the legacy system, are identified. Conversely, data structures, data definitions, data sets, calculation modules, product rules, and business functions that are present in the legacy system, but not in the target system, are also identified.

In step 340, items that are required in the target system but not present in the legacy system (based on the analysis performed in step 330) are created in the target system. For example, a product rule that exists in the legacy system, but not the target system, will be created in the target system. For customer data that is required by the target system, but does not exist in the legacy system, data-driven AI techniques may be used to generate missing the missing data.

In step 350, for each product in the legacy system (as determined in step 320), a new product is created in the target system. The new product will be fully aligned with requirements of target system, as determined in step 310.

In step 360, all products are migrated from the legacy system to the target system.

Figure 4:
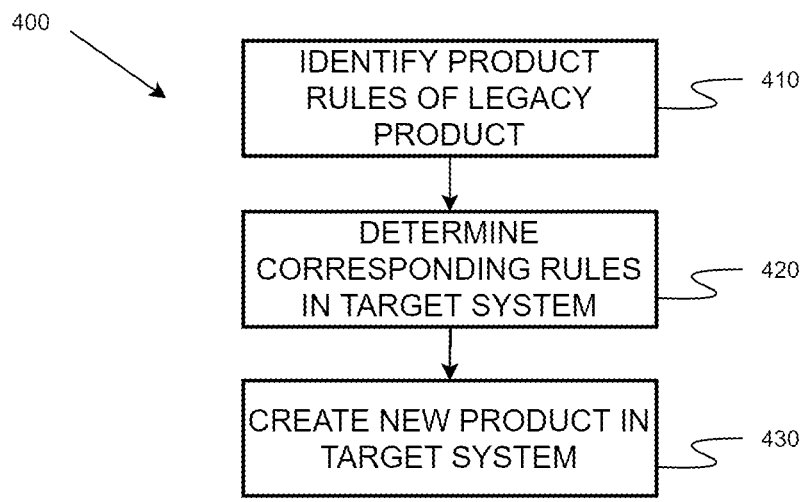
FIG. 4 illustrates one example of a method for migrating policy rules to a target system.

FIG. 4 illustrates one example of a method 400 for creating a new product in the target system based on a product in the legacy system. In an embodiment, the method creates a product in the target system with identical product rules and premium amount as the product in the legacy system. In an embodiment, for products in the legacy system with no current policyholders no new product in the target system will be created.

In step 410, the system identifies product terms, product conditions, and other product rules of the legacy product. The system also calculates and/or otherwise identifies (e.g., if it is stored in the legacy system) the premium amount of the legacy product. Where policy documents is available, the system may use any available natural language processing (NLP) or other AI techniques to identify rules, calculation methodologies, premium amounts, etc., from the available policy document(s)

In step 420, the system identifies corresponding product rules (e.g., terms, conditions, etc.) in the target system.

In step 430, the system creates a new product in the target system with the corresponding product rules as identified in step 420. The system also ensures the premium to be identical to the premium of the legacy product.

After the new products are created in the target system, the customers in the legacy system can be migrated to the target system. Much of the data in the legacy system, e.g., customer name, address, etc. may be able to be transferred directly to the target system. However, other data may not be directly compatible between the two systems. In these instances, the data from the legacy system may be converted to the format required by the target system.

Other data required by the target system may simply not exist on the legacy system. However, in such instances, the required data may be able to be predicted based on other data in the legacy system. As such, one or more models (e.g., machine learning models) may be generated to predict such data.

Figure 5:
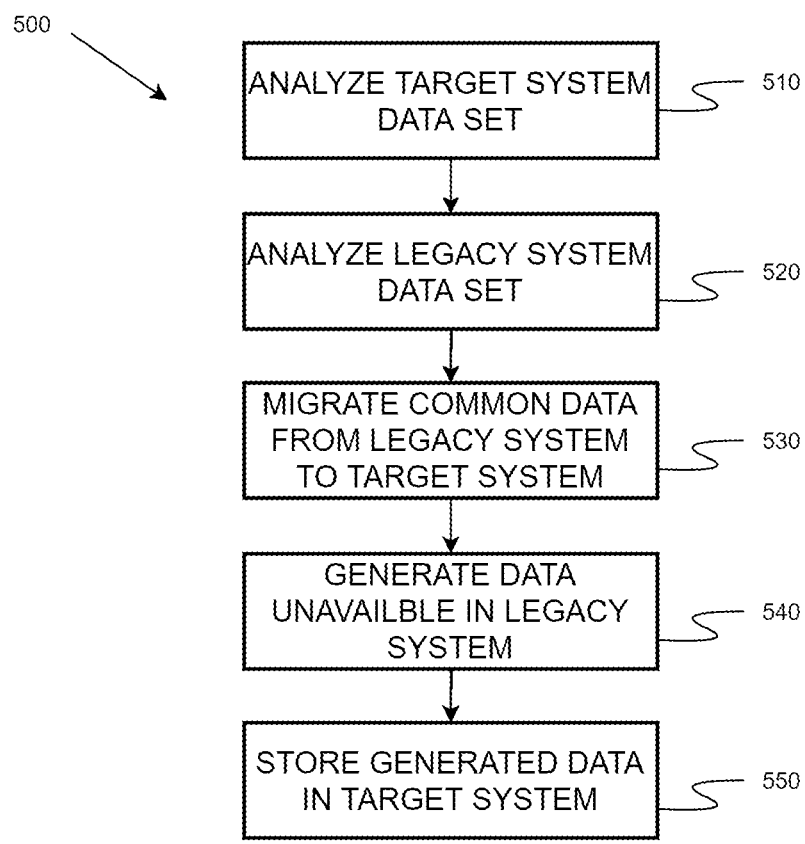
FIG. 5 illustrates one example of a method for migrating data sets from a legacy system to a target system.

FIG. 5 illustrates an example of a method 500 for migrating a data set from the legacy system to the target system. A data set may comprise customer data, patient data, or other types of data used by the legacy system.

In step 510, the data structures for the data set in the target system 220 are analyzed, e.g., by analysis system 240, to determine the data stored by the target system with respect to the data set. The particular data fields that are required by the target system data set (e.g., because they are required as part of the underlying data model or as a required input to a process or calculation module, etc.) are also determined.

In step 520, the analysis system analyzes the data structures for the corresponding data set in the legacy system to determine the data stored by the legacy system with respect to the data set. In an embodiment, the data may be divided into at least three subsets: 1) data that is present in both systems; 2) data that is present in the legacy system but not in the target system; and 3) data that is present in the target system but not in the legacy system.

In step 530, data that is present in both systems is migrated from the legacy system to the target system, e.g., using migration system 260.

In step 540, data present in the target system that is not present in the legacy system (especially if such data is required by the target system) is generated by business rules or one or more AI models that are created by data modeling system 270. The models may be trained using historical data from the legacy system.

In step 550, the data generated in step 540 is stored in the target system.

Figure 6:
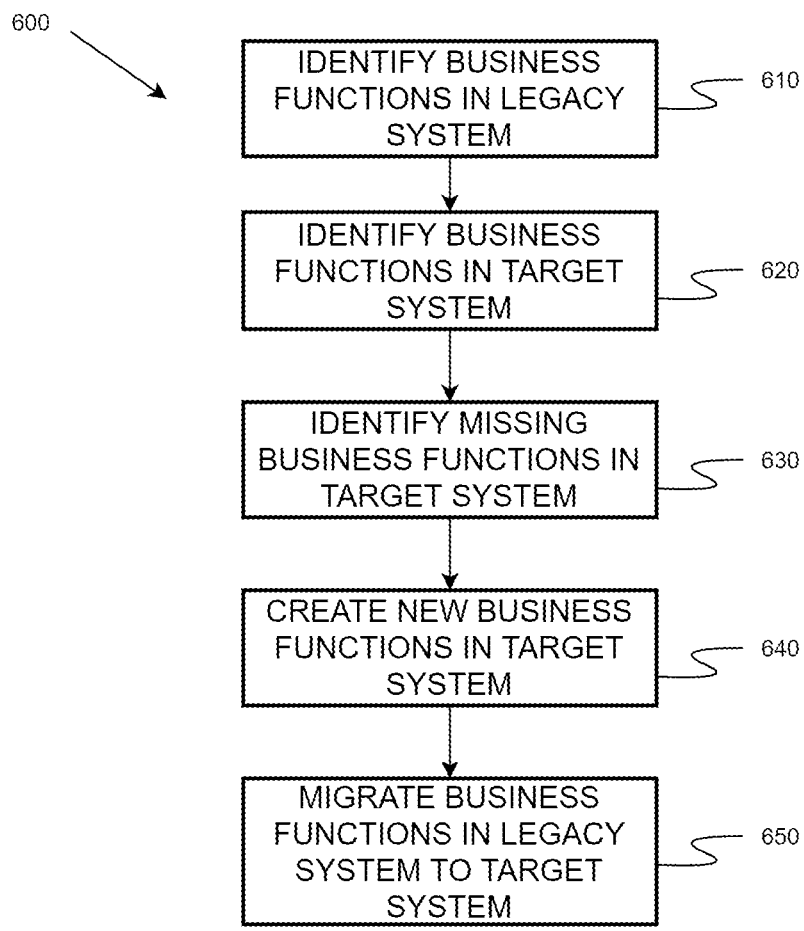
FIG. 6 illustrates one example of a method for migrating business rules to a target system.

FIG. 6 illustrates one example of a method 600 for migrating business functions or processes from the legacy system to the target system. In step 610, the system identifies all business processes/functions of the legacy system, such as product alternation processes, customer communication processes, product pricing engines, etc.

In step 620, the system identifies all business processes/functions in the target system.

In step 630, missing processes in the target system are identified. Corresponding business rules and required data points for each missing process are also identified.

In step 640, the system creates a new business process in the target system using the corresponding business rules and data points as identified in step 630.

In step 650, all business functions/processes are migrated to the target system.

Figure 7:
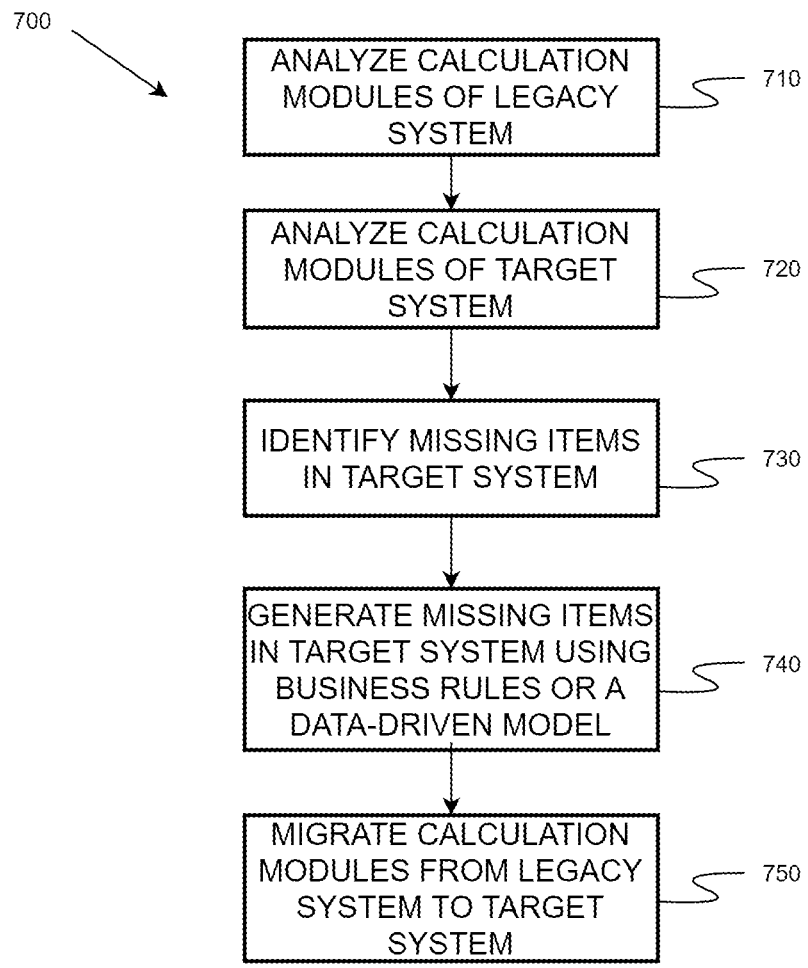
FIG. 7 illustrates one example of a method for migrating calculation modules to a target system.

FIG. 7 illustrates one example of a method 700 for migrating calculation modules from the legacy system to the target system. In step 710, the system analyzes the calculation modules of legacy systems and identifies required inputs and outputs for each calculation module. In general, the inputs and outputs will be data points from a data set in the legacy system.

In step 720, a similar analysis is performed of the calculation modules of the target system, identifying required inputs and outputs for each calculation module.

In step 730, any missing calculation modules or missing data points (as required by calculation modules in the legacy system) in the target system are identified.

In step 740, the missing modules and data points are generated in the target system based on business rules or data-driven models as described herein.

In step 750, the system migrates all calculation modules from the legacy system to the target system.

Figure 8:
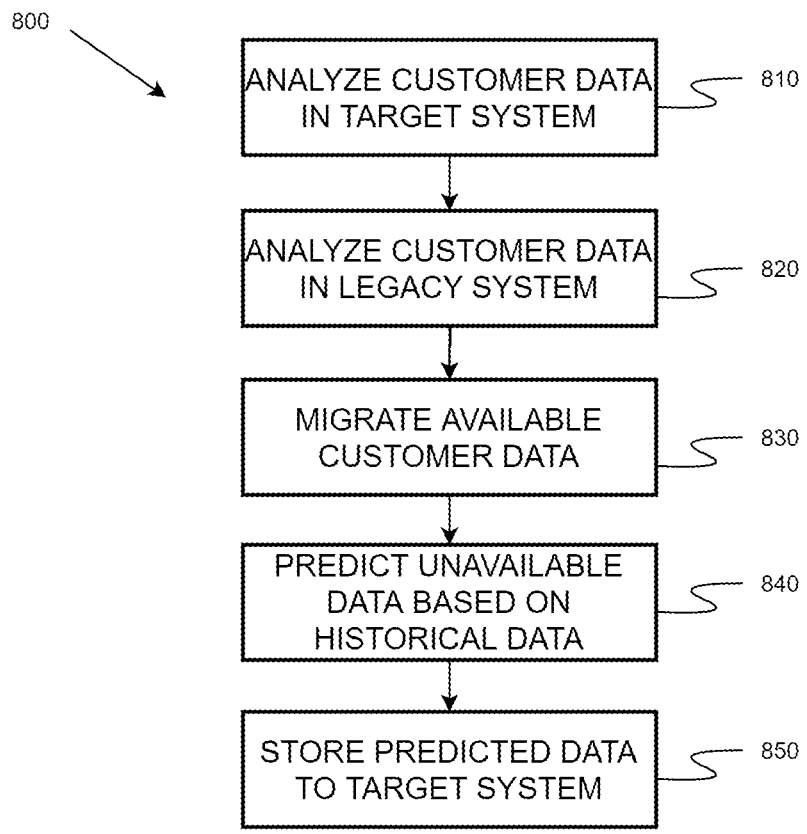
FIG. 8 illustrates an example of a method for migrating customer data from the legacy system to the target system.

FIG. 8 illustrates an example of a method 800 for migrating a customer data set from the legacy system to the target system. A customer data set may comprise information relating to each customer, e.g., personal information, financial information, asset information, etc.

In step 810, the data structures for the customer data set in the target system 220 are analyzed, e.g., by analysis system 240, to determine the customer data stored by the target system. The particular customer data fields that are required by the target system (e.g., because they are required as part of the underlying data model or as a required input to a process or calculation module, etc.) are also determined.

In step 820, the analysis system analyzes the data structures for the customer data in the legacy system to determine the customer data stored by the legacy system. In an embodiment, the customer data may be divided into at least three subsets: 1) data that is present in both systems; 2) data that is present in the legacy system but not in the target system; and 3) data that is present in the target system but not in the legacy system.

In step 830, customer data that is present in both systems is migrated from the legacy system to the target system, e.g., using migration system 260.

In step 840, customer data present in the target system that is not present in the legacy system (especially if such data is required by the target system) is predicted by one or more AI models that are created by data modeling system 270 or business rules identified from analysis system 240. The models may be trained using historical data from the legacy system. The target of the model may be the output of a business process, for example, the price of some product or policy with different attributes and/or characteristics. In a specific example, the attributes and/or characteristics of a product or policy can be used as inputs and the prices as the labels or target of a ML model.

In step 850, the customer data predicted in step 840 is stored in the target system.

Administration systems converted using the techniques described herein will see improved operation efficiency, result accuracy, and process transparency. The conversion techniques also help ensure that the outputs of business functions/processes and calculation modules are matched between the legacy system and the target system.

Historical data used to train used AI models may first be cleaned, joined, segmented, aggregated, and/or feature engineered, as necessary. Cleaning the data involves, e.g., standardizing data types and values, removing duplicated variables, removing variables with a unique value, removing obviously non-predictive variables (e.g., user id, etc.), etc.

Joining data involves collecting related data together via a common key, so data for relevant real world entities (e.g., policyholders, claimants, etc.), events (e.g., claims), etc., are associated.

Segmenting data relates to dividing the data into groups based on a common characteristic, e.g., geographic area, age, etc. Such groups are preferably segmented based on a characteristic that is more deterministic with respect to the target of the model than other characteristics.

To the extent necessary, data is aggregated to a desired granularity. The appropriate granularity will depend on the type and structure of the input variables, the target, the quantity and volatility of the input variables, and other factors.

Data to be used in training models may be extracted from unstructured data sources, e.g., text, images, videos, audio recordings, etc. For example, for unstructured text sources, the extracted features may be related to the sentiment of the text (e.g., using sentiment analysis), topics discussed in the text (e.g., using topic modeling), presence of keywords, context analysis, and other types of natural language processing or textual analysis. For images, the extracted features may be related to foreground objects, background objects, etc. For audio recordings, the extracted features may be related to sentiment (e.g., using tonal analysis), etc.

In some embodiments, the number of potential input variables may number in the thousands, and it would be impractical to train AI models using all of the variables. In such embodiments, feature engineering techniques may be used to reduce the number of variables. For example, variables with incomplete or sparse data, variables with low variance, highly correlated variables, and noisy variables may be removed from the dataset.

To further reduce the number of variables, the relative contribution of each of the variables in the data set in predicting the target value may be calculated, and only the variables with the most influence may be kept in the dataset.

After the dataset is prepared and tagged, the AI model may be trained. A hyperparameter autotuning engine may be used to tune the hyperparameters of the AI models. The number and type of hyperparameters depend on the type of model. For multi-layer perceptron (MLP) models, hyperparameters include numbers of layers, size of layers, number of nodes, number of hidden units, activation function, learning rate, momentum, etc. In one embodiment, the hyperparameter autotuning engine may comprise multiple GPUs that generate many variations of a model, each with different hyperparameters. The variations may then be tested or evaluated to determine the best or most acceptable model.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a non-transitory medium for execution by a data processing apparatus. The computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any programming language, and it can be deployed in any form, including as a standalone program or as a module, component, subroutine, or other unit suitable for use in a computing environment. A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM").

Computer readable media suitable for storing computer program instructions and data include all forms of nonvolatile memory, media, and memory devices. For example, computer readable media may include one or more of the following: semiconductor memory devices, such as ROM or RAM; flash memory devices; magnetic disks; magneto optical disks; and/or CD-ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors, and/or organic light-emitting diode ("OLED") monitors. The computer may further comprise one or more input devices by which the user can provide input to the computer. Input devices may comprise one or more of: keyboards, pointing devices (e.g., mice, trackballs, etc.), and/or touch screens. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method for converting a legacy administration system to a target administration system, the method comprising:

analyzing the legacy administration system using an analysis system to determine its components, including data sets, product rules, business processes, and calculation modules;

analyzing the target administration system using the analysis system to determine its components, such as data sets, product rules, business processes, and calculation modules;

identifying data required by the target administration system not present in the legacy administration system;

generating a prediction model targeting the required data and trained using historical data or business rules in the legacy administration system;

predicting the required data using the prediction model;

migrating data from the legacy administration system to the target administration system in compliance with the target data structures and data definitions; and storing the predicted data in the target administration system.

2. The method of claim 1, further comprising migrating a product from the legacy administration system to the target administration system.

3. The method of claim 2, wherein migrating the product comprises:
   identifying at least product rule or condition comprising the product in the legacy administration system;
   identifying at least one corresponding rule or condition in the target administration system based on the at least one legacy product rule or condition; and
   creating a product in the target administration system based on the at least one corresponding rule or condition.

4. The method of claim 1, further comprising migrating a business process from the legacy administration system to the target administration system, wherein the output of the new business process created in the target administration system matches the output of the legacy business process.

5. The method of claim 4, wherein migrating a business process comprises:
   identifying at least one rule used in the business process in the legacy administration system;
   identifying at least one corresponding rule in the target administration system based on the at least one legacy rule; and
   creating a business process in the target administration system based on the at least one corresponding rule.

6. The method of claim 1, further comprising migrating a calculation module of the legacy administration system to the target administration system, wherein the output of the calculation module migrated to the target administration system matches the output of the legacy calculation module.

7. The method of claim 6, wherein migrating a calculation module comprises identifying an item required by the calculation module not present in the target administration system.

8. The method of claim 7, wherein migrating a calculation module further comprises generating the not present item using at least one business rule.

9. The method of claim 7, wherein migrating a calculation module further comprises generating the not present item using at least one data-driven model.

10. The method of claim 1, wherein the prediction model comprises a data-driven machine learning model.

11. A system for converting a legacy administration system to a target administration system, the system comprising:
   an analysis system adapted to analyze an administrative system to determine its components, including data sets, product rules, business processes, and calculation modules;
   a product conversion system adapted to convert at least one product from a legacy administrative system to a target administrative system; and
   a migration system adapted to migrate at least one data set in the legacy administrative system to the target administrative system in accordance with the data structures and data definitions of the target administration system.

12. The system of claim 11, further comprising a data modeling system, and wherein the migration system is configured to:
   identify data required by the target administration system not present in the legacy administration system;
   generate a prediction model using the data modeling system, the prediction model targeting the required data and trained using historical data in the legacy administration system;
   predict the required data using the prediction model; and
   store the predicted data in the target administrative system.

13. The system of claim 12, wherein the prediction model comprises a data-driven machine learning model.

14. The system of claim 11, wherein the product conversion system is configured to:
   identify at least product rule or condition comprising the at least one product in the legacy administration system;
   identify at least one corresponding rule or condition in the target administration system based on the at least one legacy product rule or condition; and
   create at least one product in the target administration system based on the at least one corresponding rule or condition.

15. The system of claim 11, wherein the migration system is configured to migrate at least one business process from the legacy administration system to the target administration system, wherein the output of the new business process created in the target administration system matches the output of the legacy business process.

16. The system of claim 15, wherein the migration system is configured to:
   identify at least one rule used in the at least one business process in the legacy administration system;
   identify at least one corresponding rule in the target administration system based on the at least one legacy rule; and
   create a business process in the target administration system based on the at least one corresponding rule.

17. The system of claim 11, wherein the migration system is configured to migrate at least one calculation module of the legacy administration system to the target administration system, wherein the output of the calculation module migrated to the target administration system matches the output of the legacy calculation module.

18. The system of claim 17, wherein the migration system is further configured to identify an item required by the calculation module not present in the target administration system.

19. The system of claim 18, wherein the migration system is further configured to generate the not present item using at least one business rule.

20. The system of claim 18, wherein the migration system is further configured to generate the not present item using at least one data-driven model.

* * * * *